April 7, 1959
J. D. CLYMER ET AL
2,880,909
AUTOMATIC CIRCUIT CONTROL DEVICE
Filed Feb. 7, 1956
3 Sheets-Sheet 2
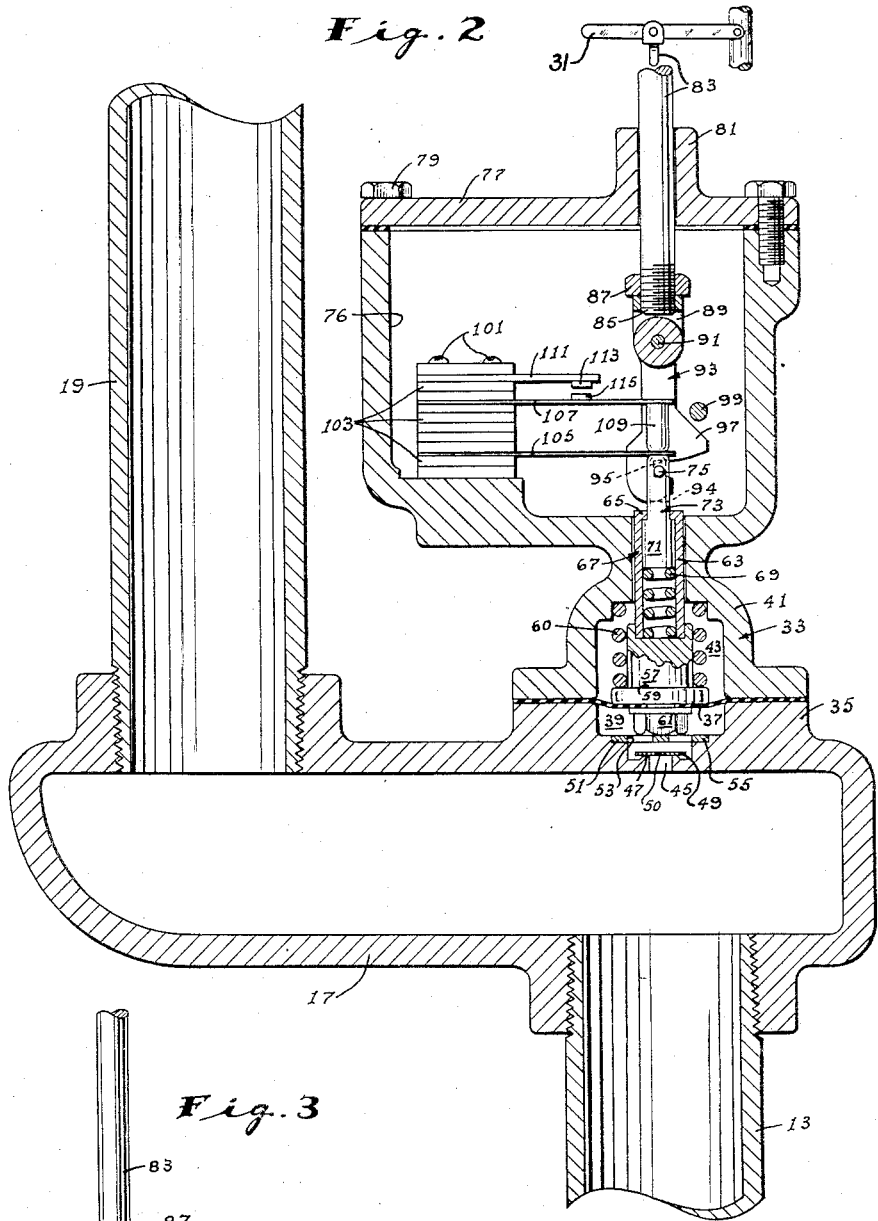
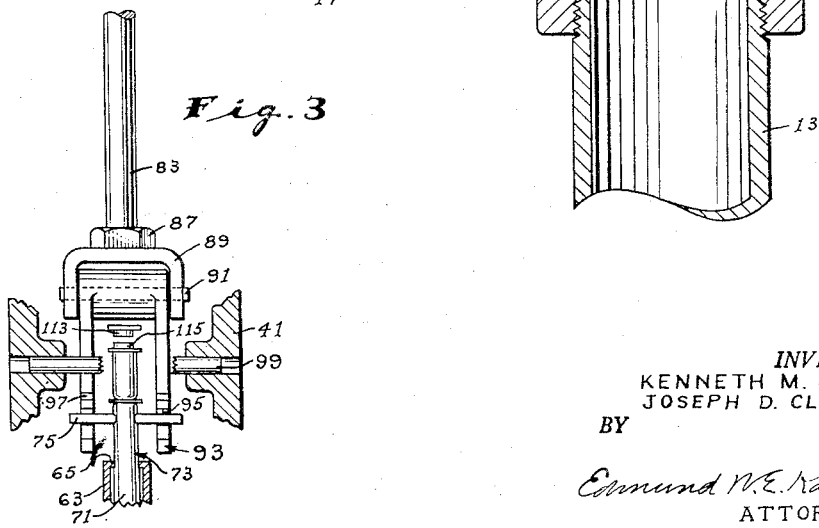
INVENTOR.
KENNETH M. SLUSHER
JOSEPH D. CLYMER
BY
Edmund W. E. Kamm
ATTORNEY April 7, 1959  J. D. CLYMER ET AL  2,880,909
AUTOMATIC CIRCUIT CONTROL DEVICE
Filed Feb. 7, 1956  3 Sheets-Sheet 3
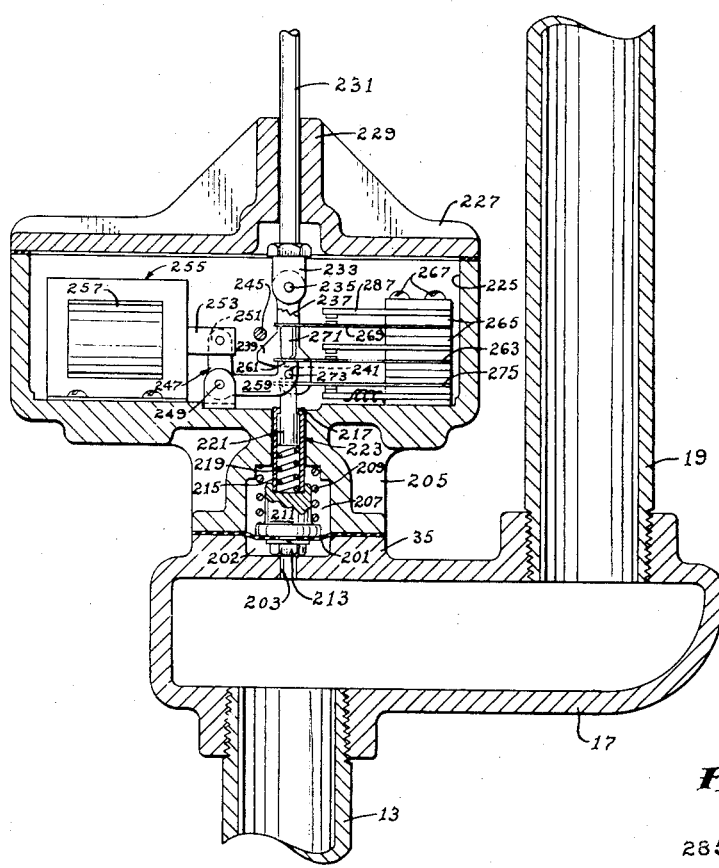
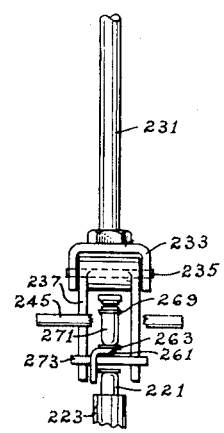
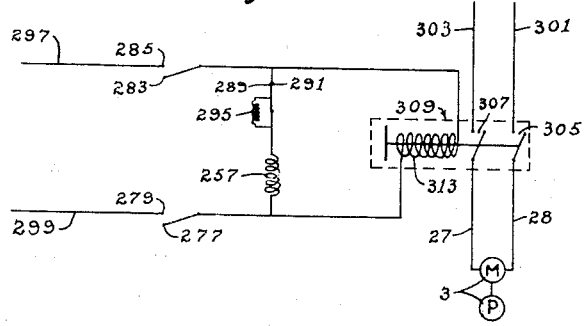
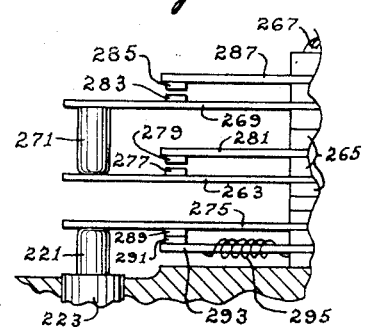
INVENTOR.
KENNETH M. SLUSHER
JOSEPH D. CLYMER
BY
Edmund W. E. Kamm
ATTORNEY

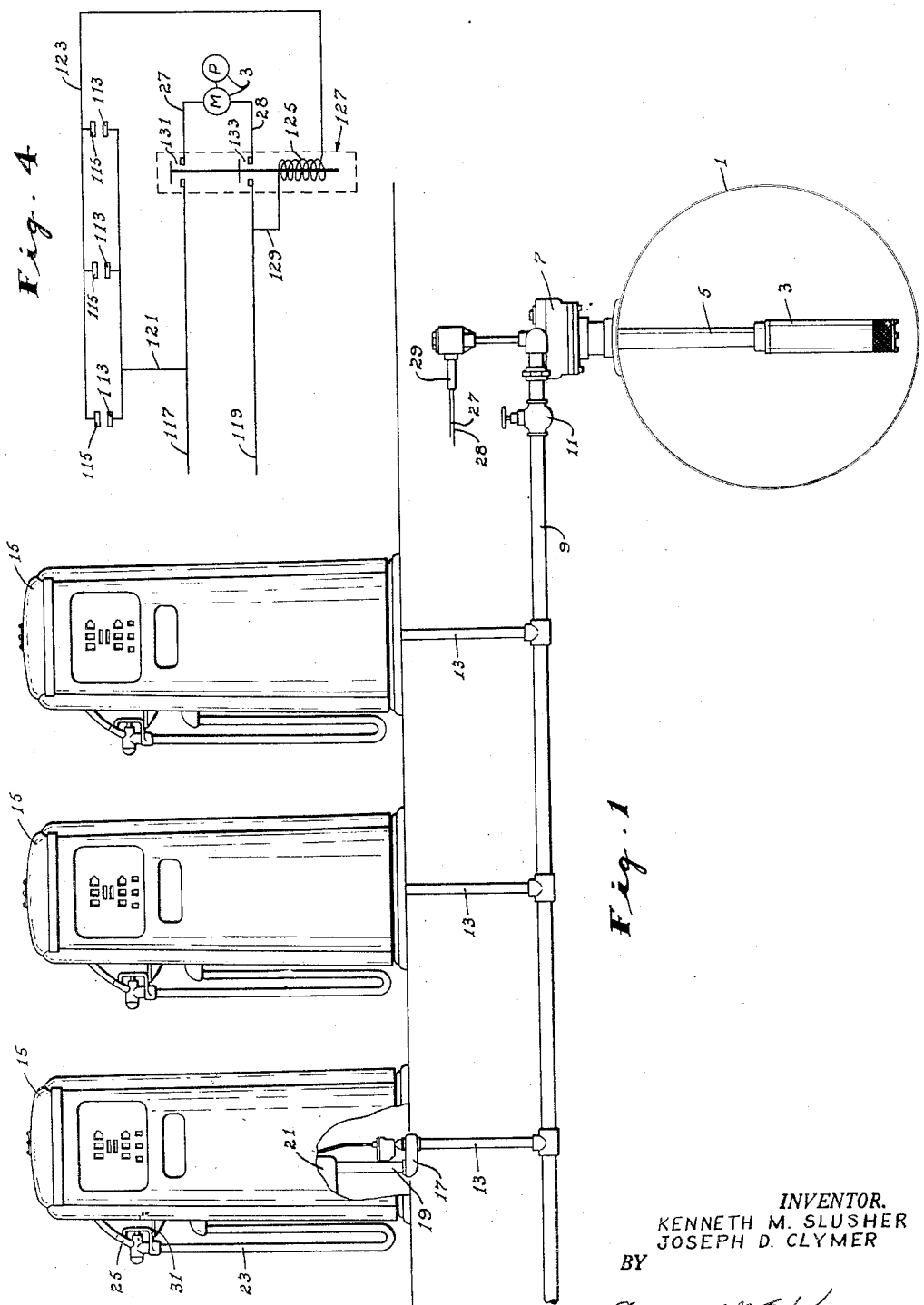

United States Patent Office 2,880,909
Patented Apr. 7, 1959

2,880,909

AUTOMATIC CIRCUIT CONTROL DEVICE

Joseph D. Clymer, Fort Wayne, Ind., and Kenneth M. Slusher, Tulsa, Okla., assignors to Tokheim Corporation, Fort Wayne, Ind., a corporation of Indiana Application February 7, 1956, Serial No. 563,883

22 Claims. (Cl. 222—54)

This invention relates to an automatic circuit control device. More specifically it relates to a circuit control device for use with remotely controlled liquid dispensing systems, particularly gasoline dispensing systems.

In systems of the kind described, a liquid supply tank is located at a point remote from the dispensing pedestals which are used to serve the customers. A motor driven pump, which may be of any type, is located in or near the tank. In such systems, there is some danger that, in the event the tank runs dry, the motor pump may be left running and in the dry state, the pump may be damaged by such operation.

Also in such syestems, in the event any line between the pump and pedestals should break, a great deal of hazardous liquid could be lost before the defect could be discovered. It is therefore desirable to provide means for automatically stopping the pump in such case.

Other difficulties may be encountered which reflect themselves in loss of pressure at the pedestal, such as pump failure or motor failure, in which case it is advisable to prevent or interrupt the energization of the electric circuit controlling the system.

It is, therefore, an object of the invention to provide automatic means for cutting off the current to the motor of the pump in the event the pressure on the discharge side of the pump fails.

These and other objects will become apparent from a study of this specification and the drawings which are attached hereto, made a part hereof and in which Figure 1 is a view of a typical gasoline dispensing system showing the pump, pedestals, tank and associated equipment.

Figure 2 a vertical sectional view of one form of the automatic circuit control device.

Figure 3 is an elevation of the switch actuating linkage used in the control device, viewed from the right of Figure 2.

Figure 4 is a wiring diagram of the system.

Figure 5 is a vertical sectional view of a modified form of automatic circuit control device.

Figure 6 is an elevation of the switch actuating linkage.

Figure 7 is a wiring diagram of the dispensing system employing the modified form of device.

Figure 8 is an enlarged view of the switch mechanism of Figure 5.

PREFERRED FORM

*Figures 1 to 4 inclusive*

Referring particularly to Figure 1, the numeral 1 represents the storage tank for the liquid to be dispensed in which may be mounted, in a conventional manner, a submerged motor and pump 3 which is connected to and supported by the discharge pipe 5 and header 7. The distribution pipe 9 is connected to the header at one end, includes a shut off valve 11 and check valves (not shown) in the header to prevent reverse flow of liquid to the tank and is connected by suitable branch pipes 13 to the various pedestals 15 through individual manifolds 17.

Each pedestal includes the manifold 17 which is connected by a pipe 19 to the meter 21. The latter is connected to discharge metered liquid to a hose 23 and a valve controlled nozzle 25 as is well known in the art.

Electric power is connected to the pump motor by means of wires 27, 28 and conduit 29. The supply of power to the motor is controlled by an operating lever or manual operator 31 which is movable between power-on and power-off positions (and associated mechanism to be described below) which is used to support the nozzle when the hook occupies the power-off position.

It is obvious that instead of the submerged pump and motor, any other type of motor driven pump may be utilized in the system without departing from the spirit of the invention.

Referring now to Figures 2 and 3, it will be seen that the circuit control device which is preferably, but not necessarily, mounted on the manifold 17, comprises a fluid motor 33 which includes a hollow boss 35 on the manifold 17 which, with a diaphragm or member 37, defines a lower or pressure chamber 39. A body 41 and the diaphragm cooperate to define an upper or spring chamber 43.

The boss 35 defines a liquid port 45 for the chamber 39 which is surrounded by a seat 47 for an inwardly opening check valve 49 which is provided with a restricted orifice 50. A stop plate 51, which is perforated at 53 to permit passage of liquid to chamber 39, is mounted in a recess 55 of the boss, above the valve 49.

A hub 57 having a spring seat 59 is mounted on the diaphragm by nut 61. A spring 60 is compressed between the seat and the body 41. The hub is provided with a coaxial tube 63 having an inwardly directed flange 65 at its upper end and which forms a portion of a lost motion connection indicated generally by numeral 67.

A compression spring 69 is mounted within the tube below the head 71 of a switch actuating tappet 73. The head 71 is held within the tube by the flange 65 and is guided for straight line reciprocation by the tube. The tappet has fixed therein, outside of the tube, a cross pin 75.

The upper portion of the body 41 is formed as an explosion-proof switch housing or chamber 76 which has a cover 77 held in place by suitable screw fasteners 79. A hollow boss 81 on the cover 77 serves to guide a plunger 83 which is connected to the operating lever 31 in any suitable manner as shown in Figure 2, so that the plunger will be raised as the hose hook is moved to the power-on position and lowered when it is moved to the power-off position.

The lower end of the plunger has adjustably mounted thereon, as by a threaded connection 85 and a jam nut 87, a clevis 89. Pivotally depending from the pin 91 spanning the clevis, is a cam hook 93 which has two depending, parallel arms each of which has a transverse notch 95 adapted to receive the pin 75 and a cam 97 which extends underneath a cam pin 99 fixed in the body 41. This mechanism is, in effect, a control means for actuating the switch means in accordance with the movement of the manual operator.

Mounted on the body 41, in chamber 76, on suitable fasteners 101 and insulator blocks 103 is a first, spring blade type, switch actuator 105 the free end of which rests on top of the tappet 73. A second switch actuator 107 is similarly mounted by 101 and 103 in a position parallel to and above actuator 105 and carries a projection 109 which depends therefrom and rests upon actuator 105, so that upward motion of the latter due to upward motion of tappet 73 will be transmitted to the former.

A switch blade 111 is also mounted on 101 and 103 and is insulated from actuators 105 and 107. The blade 111 carries a contact 113 positioned above a mating contact 115 on actuator 107. The contacts are open so long as the tappet occupies its lowermost position or a position closely adjacent thereto, are closed by the tappet when it is raised and reopen as soon as they are freed by the retraction of the tappet.

WIRING DIAGRAM

As shown in Figure 4, the lines 117 and 119 represent the two sides of the current supply main. From one side of the main, such as 117, runs a line 121 which connects together the contacts 113 of a group of pedestals 15. The remaining contacts 115 are connected by a line 123 to one side of the magnet coil 125 of the starter 127. A wire 129 connects the other side of the coil to the other main 119.

The motor of the motor pump 3 is connected to the mains 117, 119 by the switches 131, 133 of the starter and the lines 27, 28.

OPERATION

It should be here stated that, if desired, only a single pedestal may be connected with one pump as is commonly done in the art, but since the type of pump shown is usually of relatively large capacity, it is usually connected to several pedestals as shown in Figure 1.

Assuming that multiple pedestals are connected in the system and that the system is in the inoperative or unenergized condition, to start dispensing, the operator will remove the nozzle from one of the hose hooks and actuate the lever 31 to its power-on position.

The lever 31 will raise the plunger 83 and cam hook 93. The hook in turn raises the tappet 73 and the actuator 105 by reason of the engagement of pin 75 in notch 95 of the hook. Motion is transmitted through the projection or button 109 to actuator 107 which closes contacts 113, 115. As the plunger 83 is raised to its uppermost position, cam 97 engages pin 99 and pivots the hook 93 about pin 91 to disengage the pin 75 and notch 95. The lower edge of the hook may be bevelled as at 94 to facilitate reengagement of the hook with pin 75.

However, before the pin 75 and notch 95 become disengaged, the circuit to the starter coil 125 will have been energized and the latter will have closed the switches 131, 133 to energize the motor.

Under normal operating conditions the pump will have started by the time the pin and cam have disconnected the plunger from the tappet and liquid under pressure will have entered the manifold 17 and the diaphragm chamber 39 so that the tappet 71 will be held in its uppermost position by the diaphragm and associated parts so that the contacts 113, 115 will be held closed to hold the pump motor energized.

Upon completion of the delivery, the operator will restore the hose hook to its power-off condition. This will depress the plunger 83 so that cam hook will reengage pin 75 and will depress the tappet 73 against the action of spring 69. The lost motion connection 67 permits this motion of the tappet relative to the diaphragm. The actuators 105 and 107 will thus open the contacts 113, 115 and will deenergize the starter relay coil 127 so that the contacts 131, 133 supplying current to the motor will be opened.

It will be noted that the orifice 50 in the check valve 49 will permit liquid to escape gradually from the chamber 39 whenever the pressure of the liquid in the manifold is not sufficient to hold spring 60 compressed. Such lack of pressure will occur when the pump stops for any reason with the hose hook 31 in the power on position or whenever there is substantial leakage from the system during periods when the system is in operation. In such a case, the spring 60 will gradually depress the diaphragm, forcing liquid through the orifice 50 in the check valve so that the tappet tube 63 will gradually move to its lowermost position bringing the tappet 73 to its lowermost position. Since the tappet is unhooked from the plunger under such conditions, it will be seen that the switch contacts 113, 115 will be opened to deenergize the pump motor even though the hose hook is in the power-on position.

Accordingly, if while the system is in operation, the liquid supply in the tank fails, if a line 5, 9 or 13 breaks or substantial leakage develops anywhere in the system which reduces the pressure in the manifold, if the pump fails to deliver liquid, or if the motor fails to operate properly, the motor will be deenergized to prevent damage to components of the system, fire or loss of hazardous liquid.

If any of the failures described above should occur while the hose hooks are in the power-off condition, the system will be energized by the movement of a hose hook to the power-on position but only for a short time, since the above described switch opening action will start immediately and proceed under control of the orifice 50, after the hook is disconnected from its associated pin 75.

It is obvious that in either a single or a multiple pedestal system, any major leakage from any of the liquid supply lines, even up to the nozzle will reduce the pressure in the manifolds sufficiently to cause the diaphragm spring 60 to open the switch 113, 115.

In the event the hose hook of a pedestal is moved to the power-on position and thereafter the tappet 73 is depressed by spring 60, the hook and pin 75 may be reengaged merely by moving the hose hook to the power-off position. The bevelled surface 94 on the hook will engage pin 75 and displace the hook around the pin with which it is reengaged by gravity.

Contact of the hub 57 with the body 41 limits the upward motion of the diaphragm and the tappet 71.

It should also be noted that if a single operation of the hose hook fails to develop sufficient pressure in the manifold to hold the system energized, several operations may be resorted to. If the required pressure then fails to develop, an investigation should be made to determine the cause of the trouble.

MODIFIED FORM

Figures 1, 5 to 8 inclusive

Referring to Figures 1 and 5 to 8 inc., it will be seen that the device shown in Figures 5 to 6 may be used in the manifold 17 of the pedestals instead of the device of Figures 2 and 3.

In this form of the invention, the boss 35 defines with diaphragm 201 a pressure chamber 202 which communicates with the manifold through a port 203. The body 205 of the device defines, with the diaphragm or member 201, a chamber 207 for compression spring 209.

A hub 211 is fixed to the diaphragm by a suitable fastener 213 which also serves as a stop and limits the downward travel of the diaphragm by contact with the manifold. The hub 211 contacts the body 205 to limit the upward travel of the diaphragm.

A central tube 215 is fixed to the hub and has an internal flange 217 at its upper end which retains a spring 219 and the headed tappet 221 and with them constitutes a lost motion device 223.

The upper portion of the body is formed with a chamber 225 which, with cover 227 is an explosion proof housing for the switches and switch actuating mechanism described below.

Mounted in a guide boss 229 of the cover is a plunger 231 which is connected to be raised by the lever 31 when the latter is moved to its power-on position and to be lowered thereby when the lever is moved to its power-off position.

A clevis 233 is mounted on the lower end of the plunger 231 and supports a transverse pin 235 from which pivotally depends a cam hook 237 having a cam 239 and a notch 241. The hook is bevelled at its lower, tip end in the same manner as hook 93. A pin 245 is set in the body in a position to engage the cam all as explained above in connection with the preferred form. This mechanism is, in effect, a control means for actuating the switch means in accordance with the movement of the lever or manual operator.

A bell crank 247 is pivotally mounted at 249 on the body and has an arm 251 which is attached to the armature 253 of a solenoid or electric motor 255 which has a coil 257. The other arm 259 of the bell crank has a horizontal ear 261 mounted thereon which supports the free end of a first spring type switch blade or actuator 263. The latter is mounted on a suitable insulating block pile 265 which is fixed to the case by screws 267.

A second spring type switch blade or actuator 269 is also mounted on the pile and carries a projection or button 271 which engages the first actuator 263.

The arm 259 of the bell crank also has fixed to it a laterally extending pin 273 (see Fig. 6) which is positioned to be received in the notch 241 of the cam hook.

A third switch blade or actuator 275 is disposed above tappet 221, in position to be actuated thereby and also below the bell crank arm 259 in position to transmit the motion of the tappet thereto through the pin 273 (see Figure 6). The arm 259 with its ear 261 and pin 273, serves as an interponent between actuators 275 and 263 to transmit motion from one to the other.

The first switch actuator 263 carries a contact 277 which is adapted to engage a contact 279 carried by blade 281 when the actuator is raised.

The second switch actuator 269 carries a contact 283 which is adapted to engage a contact 285 carried by a blade 287 when the actuator is raised. All of the above described contacts are normally held open by their spring blades.

The third switch actuator 275 carries a contact 289 which normally engages a contact 291 carried by blade 293 and disengages same when the actuator is raised. All of the blades are supported by the block pile.

The blade 293 is preferably of bi-metallic construction and is provided with a heater coil 295, and is adapted to open switch 289, 291 when it is heated to a predetermined temperature.

WIRING DIAGRAM

Figure 7

The lines 297 and 299 represent the control circuit current supply mains while lines 301 and 303 represent the motor circuit current supply mains. The same main may obviously be used for both supplies if desired. The lines 301 and 303 are connected through the switches 305, 307 of the starter 309 to the motor of the pump-motor unit 3.

The switches 305, 307 are actuated by the starter coil 313.

It will be seen that the lines 297, 289 are controlled by the switches 283, 285 and 277, 279 which are in series with the starter coil 313.

The switch 289, 291 is connected in series with the coil 257 of solenoid 255 and the switch and coil are connected between lines 297—299 and switches 285, 279 in parallel with the starter coil. The heater coil 295 is connected to the solenoid circuit in the usual manner.

OPERATION

In this form of the invention, if it is assumed that all of the pedestals are in the non-operating condition and that the parts of the control device are in the condition shown in Figures 5 to 8, when the operator desires to make a delivery he will throw the lever 31 on a pedestal to the power-on position. This raises the plunger 231 of the selected pedestal and the hook 237 raises bell crank arm 259 by means of pin 273.

The ear 261 on the bell crank raises the first actuator 263 and through the button 271 the actuator 269 so as to close both switches 283, 285 and 277, 279. These closures energize both the solenoid coil 257 and the starter coil 313 through switch 289, 291 which is normally closed. The energized coil 257 merely holds the switches 283, 285 and 277, 279 closed since the cam hook becomes disengaged from pin 273 as the plunger moves upwardly, by the interaction of cam 239 and pin 245.

In the course of normal operation of the system, liquid under pressure will be supplied to the manifolds and diaphragm chambers after the pump has started and possibly has operated for a short time, so that the diaphragm and tappet 221 will be raised to raise switch actuator 275. This will break switch 289, 291 to deenergize solenoid coil 257. The deenergization of the coil has no effect however, since the raising of the tappet and actuator 275 serves to hold the bell crank arm 259 in its upper position to hold the switches 283, 285 and 277, 279 closed.

When the dispensing operation is completed, the operator will move the lever 31 to the power-off position and this depresses plunger 231, reengages hook 237 with pin 273, and depresses tappet 221 against the action of the spring 219. The switch actuators 263 and 269 are depressed to open their associated switches and actuator 275 is depressed to close its switch.

If and when the pressure in diaphragm chamber 202 is reduced below that required to hold spring 209 compressed, the diaphragm will approach its lowermost position without further lowering the tappet since the spring of the lost motion device 223 will expand and hold the tappet in the described position.

Assuming that the switch lever is moved to its power-on position, should there be any failure, such as any one of those listed above in connection with the preferred form of the device, which results in the failure to produce a pressure in chamber 202 within the time required for the coil 295 to heat the bi-metallic bar 293 sufficiently to open switch 289, 291, the switch will open and break the circuit through the solenoid coil 257. Since neither the hook 237 nor the bell crank 259 are, under such conditions, able to hold the tappet and the switch actuators 263 and 269 in their switch closing positions because the spring 209 will retract the tappet, the switches 277, 279 and 283, 285 will open and break the circuit to the solenoid 313. Switches 305, 309 will then break the circuit to the pump-motor.

While the pin 273 may be reengaged by the hook due to the bevelled edge 243 on the hook, reactuation of the hose hook will be ineffective to reenergize the pump circuit except momentarily until the thermal switch 289, 291 has been reclosed by cooling and then only for the length of time required to heat and reopen this switch.

If pressure and sustained operation are not achieved after a few actuations, an investigation should be made to determine the cause for the failure.

When the system is functioning properly, the operation of the hose hook to the power-off position will depress rod 231, reengage hook 237 with pin 273 and depress tappet 221 so that the switches 277, 279 and 283, 285 will open and the pump-motor will be deenergized.

While we have disclosed herein two embodiments of the invention for purposes of illustration, it is obvious that various changes and alterations may be made in the design, construction and arrangement of the various parts of the structure without departing from the spirit of the invention. Accordingly, we do not desire to be restricted to the exact forms disclosed but desire protection falling fairly within the scope of the appended claims.

We claim:

1. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator, a fluid motor connected with said delivery pipe to be pressurized by liquid therefrom and including a member adapted to move to a first position when the motor is pressurized, normally open switch means, means connecting said switch means to control said motor pump, means operable by said member when it is moved to said first position for closing said switch means, and means connecting said switch operator for controlling the closing of said switch means.

2. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator, a fluid motor connected with said delivery pipe to be pressurized by liquid therefrom and including a member adapted to move in one direction to a first position when the motor is pressurized, means for moving the member in an opposite direction to a second position when said motor is not pressurized, switch means, means connecting said switch means to control said motor pump, means including a tappet for operating said switch means, a lost motion device connecting said tappet to said member for reciprocation to and from switch closing position by said member when it moves between its first and second positions, and means connecting said switch operator for controlling the movement of said tappet independently of said member.

3. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator which is movable between power-on and power-off positions, a fluid motor connected with said delivery pipe to be pressurized by liquid therefrom and including a member adapted to move in one direction to a first position when the motor is pressurized, switch means, means connecting said switch means to control said motor pump, means including a tappet for operating said switch means, a lost motion device connecting said tappet to said member for reciprocation thereby to and from switch closing position, said member, when it moves to said first position, serving to urge said tappet toward switch closing position, and means connected with said switch operator and effective when it occupies the power-off position for preventing movement of said tappet to its switch-on position, said lost motion device including yieldable means for moving said tappet to its switch-on position when said operator is thereafter moved to the power-on position.

4. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected with said delivery pipe to be pressurized by liquid therefrom and including a member adapted to move to a first position when the motor is pressurized, switch means, means connecting said switch means to control said motor pump, means including a tappet for actuating said switch means, lost motion means connecting said member to urge said tappet toward switch closing position when the member moves to said first position, and means connecting said switch operator for controlling the movement of said tappet, said last named means including control means disposed adjacent said actuating means and connected to be moved by said switch operator, means for latching said actuator and control means together when the switch operator is moved to its power-off position and means for disabling said latching means when said switch operator is moved to power-on position.

5. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected with said delivery pipe to be pressurized by liquid therefrom and including a member adapted to move to a first position when the motor is pressurized, switch means, means connecting said switch means to control said motor pump, means including a tappet for actuating said switch means, means including a yieldable lost motion device for connecting said member to urge said tappet toward switch closing position when the member moves to said first position, and means connecting said switch operator for controlling the movement of said tappet, said last named means including control means disposed adjacent said switch actuating means and connected to be moved by said switch operator, means for latching said control means and actuating means together when the switch operator is moved to its power-off position, means for disabling said latching means when said switch operator is moved to power-on position, said connecting means, latching means and control means serving to move said actuating means to switch open position when the switch operator moves to its power-off position, while said member occupies its said first position.

6. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected with said delivery pipe to be pressurized by liquid therefrom and including a member adapted to move in one direction to a first position when the motor is pressurized, switch means, means connecting said switch means to control said motor pump, means including a tappet for actuating said switch means, yieldable lost motion means connecting said member to urge said tappet toward switch closing position when the member moves to said first position, control means connected for operation by said switch operator, including latching means for normally connecting said control means with said actuating means for moving them to switch open position when said operator moves to power-off position and for moving them to switch closing position when the operator is moved to power-on position, means for disabling said latching means after said actuating means have moved to switch closing position and means for moving said actuating means to switch open position in the event said fluid motor is not pressurized.

7. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected with said delivery pipe to be pressurized by liquid therefrom and including a member adapted to move in one direction to a first position when the motor is pressurized, switch means, means connecting said switch means to control said motor pump, means including a tappet for actuating said switch means, means connecting said member to urge said tappet toward switch closing position when the member moves to its first position, control means connected for operation by said switch operator, means for latching said control means to said tappet for moving said actuating means to switch closing position when the operator is moved to power-on position, means for disconnecting said latching means after said tappet has moved to switch closing position, means for reopening said switch in the event said fluid motor is not pressurized, and means for slowing the operation of said reopening means.

8. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator having power-off and power-on positions, a fluid motor connected with said delivery pipe to be pressurized by liquid therefrom and including a member adapted to move in a one direction to a first position when the motor is pressurized, additional means for yieldably urging said member in an opposite direction to a second position when the motor is not pressurized, normally open switch means, means connecting said switch means to control said motor pump, a tappet, means including a lost motion device connecting said tappet for movement between extended and collapsed positions relative to said member in the directions of motion of said member, yieldable means for holding said tappet extended in said one direction, said switch means having actuator means disposed for operation by said tappet and so constructed and arranged that said actuator means and tappet close said switch means when tappet is extended and said fluid motor is pressurized, but open said switch means when either said tappet is not extended or said fluid motor is not pressurized and means operable by said switch operator for moving said tappet to and from extended position to actuate the switch actuating means.

9. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator having power-off and power-on positions, a fluid motor connected with said delivery pipe to be pressurized by liquid therefrom and including a member adapted to move in a one direction to a first position when the motor is pressurized, means for moving said member in the opposite direction to a second position when said motor is not pressurized, normally open switch means, means connecting said switch means to control said motor pump, means including a tappet mounted on said member by means of a lost motion mounting for reciprocation with and relative to said member in said directions, yieldable means for holding said tappet extended in said one direction, said switch means having actuator means disposed for operation by said tappet and so constructed and arranged that said actuator means and tappet close said switch means when tappet is extended and said member occupies its first position, but open said switch means when either said tappet is not extended or said member occupies its second position, and means operable by said switch operator and said yieldable means cooperating to move said tappet to and from extended position to close and open the switch means when said member occupies its first position and for moving said tappet to extended position and said member toward its second position when said fluid motor is not pressurized.

10. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator having power-off and power-on positions, a fluid motor connected with said delivery pipe to be pressurized by liquid therefrom and including a member adapted to move in one direction to a first position when the motor is pressurized, first yieldable means for moving said member in an opposite direction to a second position when said motor is not pressurized, normally open switch means, means connecting said switch means to control said motor pump, means including a tappet mounted on said member by means of a lost motion mounting for reciprocation with and with respect to said member in said directions, second yieldable means for holding said tappet extended in said one direction, said switch means having actuator means disposed for operation by said tappet and so constructed and arranged that said actuator means and tappet will close said switch means when tappet is extended and when said member occupies said first position, said switch means being open when either said tappet is not extended or said member occupies said second position, control means operable by said switch operator and said second yieldable means cooperating to move said tappet to and from extended position as said operator moves from power-on to power-off position to actuate the switch while said member occupies said first position and for moving said tappet and member to switch closing position when said fluid motor is not pressurized, said last named means including latch means connected with said control means and adapted to engage said tappet when the switch operator is in the power-off position and means for disengaging said latch means as said switch operator moves to its power-on position to free said tappet and said member for movement to said second position when said motor is not pressurized so as to free said switch means for reopening.

11. The structure defined by claim 10 wherein said latch means comprises a hook mounted for pivotal movement on and for translatory motion with said control means and means projecting from said tappet positioned for engagement by pivotal movement of said hook and said disengaging means comprises cam and follower means for causing said hook to pivot in an unhooking direction.

12. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator having power-off and power-on positions, a fluid motor connected with said delivery pipe to be pressurized by liquid therefrom and including a member adapted to be moved by said motor in one direction to a first position when the motor is pressurized, yieldable means for urging said member in an opposite direction to a second position, normally open switch means, means connecting said switch means to control said motor pump, means connecting said switch operator for closing said switch means when said operator occupies its power-on position and for freeing said switch means to open when said operator occupies its power-off position, means for disabling said connecting means as said operator approaches the power-on position and means operable by said member when it occupies said first position for holding said switch means closed and for freeing said switch means to reopen when said member occupies its second position.

13. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator having power-off and power-on positions, a fluid motor connected with said delivery pipe to be pressurized by liquid therefrom and including a member adapted to move in one direction to a first position when the motor is pressurized, means for moving said member in an opposite direction to a second position when said motor is not pressurized, normally open switch means, means including a tappet mounted on said member by means of a lost motion device for reciprocation in said directions with and with respect to said member, yieldable means for holding said tappet extended in said one direction, said switch means having actuator means disposed for operation by said tappet and so constructed and arranged as to close said switch means when tappet is extended and said member occupies said first position but to free said switch means to open when either said tappet is not extended or said member occupies said second position and means operable by said switch operator for preventing closure of said switch means when said operator occupies the power-off position irrespective of the condition of said motor.

14. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, switch means, means connecting said switch means to control said motor pump, means for actuating said switch means comprising a tappet mounted on said member and control means connected to said operator and having switch open and switch closed positions corresponding to the power-off and power-on positions of said operator, an interponent disposed between said tappet and said control means, said member, tappet and interponent serving to urge said switch means toward closed position when said fluid motor is pressurized.

15. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, switch means, means connecting said switch means to control said motor pump, means for actuating said switch means comprising a tappet mounted on said member for movement with and relative to said member in said direction by means of a lost motion device having means to hold said tappet extended in said direction and control means connected to said operator and having switch open and switch closed positions corresponding to the power-off and power-on positions of said operator, an interponent disposed between said tappet and said control means, said member, tappet and interponent serving to urge said switch means to closed position when said fluid motor is pressurized, said control means and interponent serving to prevent such movement of said tappet when said control means occupies its switch-open position.

16. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, switch means, means connecting said switch means to control said motor pump, means for actuating said switch means comprising a tappet mounted on said member for movement in said direction with and relative to said member by means of a lost motion device having means to hold said tappet extended in said direction and control means connected to said operator and having switch open and switch closed positions corresponding to the power-off and power-on positions of said operator, and interponent disposed between said tappet and said control means, said member, tappet and interponent serving to urge said switch means to closed position when said fluid motor is pressurized, said control means and interponent serving to prevent such movement of said tappet when said control means occupies its switch open position, an electric motor having means for moving said interponent and switch means to closing position when said electric motor is energized, an additional, normally closed switch in series circuit with said electric motor, said additional switch including means disposed for operation by said tappet to open said switch when the member moves to its first position with the switch means in closing position.

17. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, switch means, means connecting said switch means to control said motor pump, means for actuating said switch means comprising a tappet mounted on said member for movement with and relative to said member in said direction by means of a lost motion device having means to hold said tappet extended in said direction and control means connected to said operator and having switch open and switch closed positions corresponding to the power-off and power-on positions of said operator, an interponent disposed between said tappet and said control means, said member, tappet and interponent serving to urge said switch means to closed position when said fluid motor is pressurized, said control means including means cooperating with said interponent to momentarily move said switch means to closed position when said control means moves to switch-on position and to prevent such movement of said switch means when it occupies the switch-off position, an electric motor having means for moving said interponent and switch means to closing position when said electric motor is energized, an additional, normally closed switch in series circuit with said electric motor, said additional switch including means disposed for operation by said tappet to open said switch when the member is moved to its first position with said switch means in closed position, thermal responsive means for opening said additional switch after said electric motor has been held energized a predetermined time with said switch means in closed position, the circuit including said additional switch, thermal responsive means and electric motor being connected for energization by closure of said first mentioned switch means.

18. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, and means for moving said member in an opposite direction to a second position when said motor is not pressurized, normally open switch means, means connecting said switch means to control said motor pump, means for actuating said switch means comprising a tappet, a lost motion device for mounting said tappet on said member for movement with and relative to said member in said direction and control means connected to said operator and having switch open and switch closed positions corresponding to the power-off and power-on positions of said operator, an interponent disposed between said tappet and said control means, said member, tappet and interponent serving to urge said switch means to closed position when said fluid motor is pressurized, said control means including latch means for connecting said control means with the interponent to actuate it and the switch means to closed position and to actuate them to and hold them in open position as said switch operator moves to and from power-on position, irrespective of the position occupied by said member.

19. The structure defined by claim 18 wherein means are provided for disabling said latch means when said control means has moved to switch-closing position to free said switch means to reopen, said member, tappet and interponent serving to hold said switch means closed when said member occupies its first position.

20. The structure defined by claim 18 wherein means are provided for disabling said latch means when said control means has moved to switch closing position to free said switch means to reopen, said member tappet and interponent serving to hold said switch means closed when said member occupies its first position, an electric motor connected with said interponent and serving, when energized, to hold said interponent and switch means in closed position, a circuit for said electric motor connected to be closed by closure of said switch means, a normally closed switch disposed in said circuit in series with said electric motor, and means operable by said tappet when said member occupies its first position for opening said switch to deenergize said electric motor.

21. The structure defined by claim 18 wherein means are provided for disabling said latch means when said control means has moved to switch closing position to free said switch means to reopen, said member tappet and interponent serving to hold said switch means closed when said member occupies its first position, an electric motor connected with said interponent and serving, when energized, to hold said interponent and switch means in closed position, a circuit for said electric motor connected to be closed by closure of said switch means, a normally closed switch disposed in said circuit in series with said electric motor, and means operable by said tappet when said member occupies its first position for opening said switch to deenergize said electric motor, thermally responsive means connected in series with said electric motor for opening said switch in the event it is not opened by said tappet within a limited time after said switch means are closed.

22. In a liquid dispensing system comprising a tank, a delivery pipe, a motor pump connected to withdraw liquid from said tank and discharge it under pressure into said delivery pipe, a dispensing pedestal connected to said delivery pipe at a point remote from said pump, said pedestal including a manually controlled switch operator movable between power-on and power-off positions, a fluid motor connected to said delivery pipe to be pressurized by liquid therefrom and including a member adapted to move in one direction to a first position when said motor is pressurized, self opening switch means, means connecting said switch means to control said motor pump, means for actuating said switch means comprising a tappet, a lost motion mounting said tappet for movement with and relative to said member in said direction, control means connected to said operator and having switch open and switch closed positions corresponding to the power-off and power-on positions of said operator, an interponent disposed between said tappet and said control means, said member, tappet and interponent serving to urge said switch means to closed position when said fluid motor is pressurized, said control means including latch means for connecting it with the interponent to actuate it and the switch means to and from switch closed position as said switch operator moves to and from power-on position and means for disabling said latch means as the switch operator moves into its power-on position, said member and tappet serving thereafter to hold said switch means in closed position when said member occupies its first position, said switch means acting to reopen when said latch means are disabled and said motor is not pressurized, said latching means and lost motion device cooperating to move said interponent and switch means to switch open position when said operator is moved to said power-off position while said member occupies its first position.

References Cited in the file of this patent

UNITED STATES PATENTS

| | | |
|---|---|---|
| Re. 17,294 | Stedwell | May 14, 1929 |
| 830,209 | Conkling et al. | Sept. 4, 1906 |
| 1,643,239 | Drabing | Sept. 20, 1927 |
| 1,960,662 | Como et al. | May 29, 1934 |
| 2,326,415 | Titus | Aug. 10, 1943 |
| 2,514,673 | Rider | July 11, 1950 |
| 2,634,885 | North | Apr. 14, 1953 |
| 2,678,752 | West | May 18, 1954 |